Patented Apr. 9, 1935

1,996,739

UNITED STATES PATENT OFFICE 1,996,739

PRODUCTION OF CONDENSATION PRODUCTS FROM AROMATIC HYDROCARBONS

Otto Drossbach and Ernst Roell, Ludwigshafen-on-the-Rhine, Germany, assignors to I. G. Farbenindustrie Aktiengesellschaft, Frankfort-on-the-Main, Germany No Drawing. Original application December 4, 1930, Serial No. 499,967. Divided and this application June 9, 1933, Serial No. 675,088. In Germany December 16, 1929

4 Claims. (Cl. 260—168)

The present application has been divided out from our copending application Ser. No. 499,967, filed December 4th, 1930.

The present invention relates to the production of condensation products from aromatic hydrocarbons.

It is already known that condensation products of the type of diphenyl are obtained by the treatment of aromatic hydrocarbons such as benzene, toluene, xylene, naphthalene or anthracene at temperatures of 700° C. and more. In order to obtain a better utilization of the heated chamber it has been proposed to allow the vapors of the hydrocarbons, if desired in mixture with steam, to flow over pieces of quartz, pumice or coke. Working in this manner is not suitable for the preparation of uniform products, as for example of diphenyl from benzene, because a large number of other substances, in particular higher condensation products, are formed and a part of the initial materials is entirely destroyed by the formation of methane and the deposition of carbon. This drawback may be obviated by carrying out the process at the lowest temperature at which diphenyl is mainly formed, but in this case only extremely small yields are obtained.

We have now found that good yields of the desired condensation products, in particular of diphenyl from benzene are obtained without any appreciable formation of higher condensation products by carrying out the condensation of aromatic hydrocarbons containing less than 2 carbon atoms in an aliphatic side chain if such be present, in the presence of catalysts of difficultly reducible, preferably difficultly fusible, metal oxides. Hydrocarbons containing more than 1 carbon atom in an aliphatic side chain cannot be employed, since otherwise styrene and its homologues would be formed. As examples of suitable catalysts may be mentioned in particular difficultly reducible metal oxides, as for example the oxides of the earth metals, i. e. the alkaline earth or earth metals such as calcium, barium, strontium, magnesium, titanium, cerium, zirconium, thorium, or of tungsten, molybdenum, manganese, chromium, uranium, aluminium, vanadium, beryllium and the like but also oxides of the alkali metals or mixtures thereof with the aforesaid oxides may be employed. Instead of feeding the reaction space with the said oxides, compounds of the corresponding metals may be used which are decomposed into oxides by heating. The catalysts are preferably subjected to a pretreatment with aliphatic or other easily decomposed hydrocarbons, such as ethylene or benzine hydrocarbons, at temperatures of about 700° C., so that they are provided with a coating of lustrous or crystalline carbon and are somewhat stabilized thereby. In the aforesaid compounds of the metals, the oxides of which are referred to above, the metals may constitute the anions as well as the cations, as for example vanadates, chromates, tungstates, molybdates, aluminates, zincates, and calcium or aluminium borates phosphates or silicates and compounds containing metals as anions and cations such as calcium, barium, cerium or zinc chromates, cerium tungstate or molybdate and the like. Easily reducible metal oxides, or other compounds of the corresponding metals, such as iron or lead, must not be used since they tend to produce a decomposition of the initial hydrocarbons and formation of soot or amorphous carbon. Cobalt oxide, however, which is less easily reducible than lead oxide, may be employed in small quantities in conjunction with preponderating quantities of difficultly reducible metal oxides. The reaction temperatures are generally between about 500° and 800° C.

It is preferable to select the velocity of flow of the hydrocarbon vapors sufficiently high that only from about 10 to 15 per cent of the latter are converted into compounds of the type of diphenyl in a single operation. The unconverted vapors serve as a guide gas and a diluent and at the same time flush the resulting products from the catalyst; they prevent the hydrocarbons from remaining on the catalyst for too long a period of time and also prevent the formation of higher condensation products. A similar effect is obtained if the vapors of the initial materials are preferably employed in a diluted state. The dilution of the hydrocarbons to be converted can be effected by the addition of inert gaseous diluents such as gases or vapors inert to the initial materials as for example nitrogen, methane, water vapor or carbon dioxide, whereas oxygen or gases containing the same cannot be employed as diluents since otherwise at least partial combustion of the initial hydrocarbons would occur. When water vapor is employed zinc oxide may serve as a catalyst, since it is not reduced to metallic zinc in the presence of water vapor, but easily reducible metal oxides such as those of copper or silver are not employed even when water vapor is employed as a diluent.

The process may be carried out in a cycle, and by repeatedly returning the unconverted initial materials to the reaction chamber a very good yield, up to quantitative yields, per unit of space and time is obtained.

The following examples will further illustrate the nature of this invention, but the invention is not restricted to these examples.

Example 1

A catalyst is prepared by graphitizing moulded magnesium oxide with ethylene at 700° C. Vaporized benzene is then led at 775° C. over the catalyst in an amount per hour (calculated with reference to the unit per volume of the benzene in the liquid state) corresponding to 1.5 times the volume of the catalyst employed. The vapors leaving the reaction vessel are cooled to the boiling point of benzene whereby the diphenyl formed is separated. The unconverted benzene is returned to the reaction vessel after replenishing the benzene which has been used up. At least 10 per cent of the benzene is converted in a single operation and after returning the residual benzene about 90 per cent of the benzene employed is converted into diphenyl and about 10 per cent is converted into higher condensation products, mainly into diphenyl-benzene.

Example 2

A mixture of 1 part by volume of naphthalene vapor and 0.2 part by volume of water vapor is passed at 800° C. over a catalyst which has been prepared by graphitizing a mixture of equal parts of tungstic acid and of aluminium oxide by passing vapors of benzine thereover at 700° C., the velocity of the initial vaporous mixture per hour and per liter of the catalyst being one liter of the naphthalene and water mixture calculated in the liquid form. The vapors issuing from the reaction vessel are cooled and the reaction product together with unaltered naphthalene is separated from the water. The solid reaction products are subjected to a distillation at 150° C. with superheated steam whereby the main quantities of naphthalene are removed, which are then pressed and returned into the process. The distillation residue, constituting a tough, brown mass is then subjected to fractional distillation. At a pressure of about 760 millimeters of mercury and at from 215° to 220° C., remainders of naphthalene are obtained, 40 per cent of the product distilling over at from 15 to 20 millimeters and at from 250° to 280° C., 35 per cent at from 1 to 2 millimeters and at from 200° to 225° C., 20 per cent being retained in the still. The fractions distilled off in vacuo constitute a yellowish brown mass and are dissolved in boiling xylene from which $\beta, \beta'$-dinaphthyl having a melting point of 186° C. crystallizes out on cooling. After evaporating the xylene a tough, brown mass remains from which further crystals separate out after prolonged standing which consist of $\alpha, \alpha'$-dinaphthyl having a melting point of 156° C.; the residue contains higher condensation products of naphthalene. The residue of the distillation is an asphalt-like mass.

In one operation about 20 per cent of the naphthalene are brought to reaction, two thirds of the reaction product consisting of dinaphthyl and mainly of $\beta, \beta'$-dinaphthyl.

What we claim is:—

1. In the catalytic production of condensation products of aromatic mono- and binuclear hydrocarbons, in which any aliphatic side chains present contain less than two carbon atoms, while heating to from 500° to 800° C., the step which comprises carrying out the reaction in the presence of a catalyst comprising essentially at least one difficultly reducible metal oxide and a superficial coating of lustrous carbon, but in the absence of free oxygen.

2. In the catalytic production of condensation products of aromatic mono- and binuclear hydrocarbons, in which any aliphatic side chains present contain less than two carbon atoms, while heating to from 500° to 800° C., the step which comprises carrying out the reaction in the presence of a catalyst, comprising essentially at least one difficultly reducible metal oxide and a superficial coating of lustrous carbon, and of a gaseous diluent inert to the initial hydrocarbon.

3. In the catalytic production of condensation products of aromatic mono- and binuclear hydrocarbons, in which any aliphatic side chains present contain less than two carbon atoms, while heating to from 500° to 800° C., the step which comprises carrying out the reaction in the presence of a catalyst comprising essentially at least one difficultly reducible metal oxide and a superficial coating of lustrous carbon, but in the absence of free oxygen, while passing the initial hydrocarbon over the catalyst at such a high velocity that up to 15 per cent only of the hydrocarbon is condensed in one operation.

4. In the catalytic production of diphenyl from benzene, while heating to from 700° to 800° C., the step which comprises carrying out the reaction in the presence of a catalyst comprising essentially at least one difficultly reducible metal oxide and a superficial coating of lustrous carbon, but in the absence of free oxygen.

OTTO DROSSBACH.
ERNST ROELL.